(12) United States Patent
Wilson

(10) Patent No.: US 8,929,520 B2
(45) Date of Patent: Jan. 6, 2015

(54) INTERNET PHONE SYSTEM AND DIRECTORY SEARCH ENGINE USING SAME

(75) Inventor: James E. Wilson, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1294 days.

(21) Appl. No.: 12/347,710

(22) Filed: Dec. 31, 2008

(65) Prior Publication Data

US 2009/0103459 A1 Apr. 23, 2009

Related U.S. Application Data

(60) Division of application No. 10/927,753, filed on Aug. 25, 2004, which is a continuation of application No. 08/777,824, filed on Dec. 31, 1996, now Pat. No. 6,829,231.

(51) Int. Cl.

| | |
|---|---|
| *H04M 7/00* | (2006.01) |
| *H04L 12/28* | (2006.01) |
| *H04M 1/253* | (2006.01) |
| *H04M 1/2745* | (2006.01) |
| *H04L 29/12* | (2006.01) |
| *H04M 3/42* | (2006.01) |
| *H04M 3/493* | (2006.01) |

(52) U.S. Cl.
CPC ............ *H04M 7/006* (2013.01); *H04L 12/2856* (2013.01); *H04L 12/2898* (2013.01); *H04M 1/2535* (2013.01); *H04M 1/274558* (2013.01); *H04M 7/0057* (2013.01); *H04L 29/12009* (2013.01); *H04L 61/00* (2013.01); *H04M 3/42* (2013.01); *H04M 3/42289* (2013.01); *H04M 3/4931* (2013.01)
USPC ........................................ 379/90.01; 370/271

(58) Field of Classification Search
None
See application file for complete search history.

(56) References Cited

U.S. PATENT DOCUMENTS

| | | | |
|---|---|---|---|
| 4,638,298 | A | 1/1987 | Spiro |
| 4,959,855 | A | 9/1990 | Daudelin |

(Continued)

FOREIGN PATENT DOCUMENTS

| | | |
|---|---|---|
| EP | 0781016 | 6/1997 |
| JP | 09-172459 | 6/1997 |

(Continued)

OTHER PUBLICATIONS

Low, et al., "WebIN—An Architecture for Fast Deployment of IN-based Personal Services," IEEE Intelligent Network Workshop (IN '96), 12 pages, Apr. 21-24, 1996.

(Continued)

*Primary Examiner* — Melanie Jagannathan
*Assistant Examiner* — Jason Harley

(57) ABSTRACT

An Internet compatible dialer pad is used to dial into an Internet server to provide services similar to those found on the Plain Old Telephone System ("POTS"). The dialer pad has an integrated modem set, an extended keypad with alphanumeric entry keys and function keys, display screen and display electronics that renders visual call progress information to the user as well as other communications indicators and related information about the current Internet connection. The dialer uses the Public Switched Telephone System ("PSTN") and standard LAN/WAN technology to give the user entry into a plurality of Internet calling functions. An Internet database is maintained and permits the dialing party to obtain callee information by entering alphanumeric characters via the dialer. Links from the PSTN to an Internet data base are not restricted to a specific digital data protocol.

18 Claims, 6 Drawing Sheets

(56) References Cited

U.S. PATENT DOCUMENTS

| | | | |
|---|---|---|---|
| 5,117,451 A | 5/1992 | Ladd et al. | |
| 5,150,954 A | 9/1992 | Hoff | |
| 5,339,358 A | 8/1994 | Danish et al. | |
| 5,475,733 A | 12/1995 | Eisdorfer et al. | |
| 5,604,737 A | 2/1997 | Iwami et al. | |
| 5,610,910 A | 3/1997 | Focsaneanu et al. | |
| 5,627,887 A | 5/1997 | Freedman | |
| 5,724,412 A * | 3/1998 | Srinivasan | 379/93.23 |
| 5,726,984 A | 3/1998 | Kubler et al. | |
| 5,760,824 A | 6/1998 | Hicks | |
| 5,761,280 A * | 6/1998 | Noonen et al. | 379/93.27 |
| 5,761,294 A | 6/1998 | Shaffer et al. | |
| 5,764,736 A | 6/1998 | Shachar et al. | |
| 5,805,587 A | 9/1998 | Norris et al. | |
| 5,818,836 A * | 10/1998 | DuVal | 370/389 |
| 5,838,665 A | 11/1998 | Kahn et al. | |
| 5,838,682 A * | 11/1998 | Dekelbaum et al. | 370/401 |
| 5,841,840 A | 11/1998 | Smith et al. | |
| 5,850,433 A | 12/1998 | Rondeau | |
| 5,884,032 A | 3/1999 | Bateman et al. | |
| 5,889,951 A * | 3/1999 | Lombardi | 709/219 |
| 5,940,479 A | 8/1999 | Guy et al. | |
| 6,011,794 A * | 1/2000 | Mordowitz et al. | 370/389 |
| 6,031,867 A | 2/2000 | Johnson et al. | |
| 6,049,835 A | 4/2000 | Gagnon | |
| 6,078,579 A | 6/2000 | Weingarten | |
| 6,101,182 A | 8/2000 | Sistanizadeh et al. | |
| 6,133,940 A | 10/2000 | Noonen et al. | |
| 6,185,184 B1 | 2/2001 | Mattaway et al. | |
| 6,226,678 B1 * | 5/2001 | Mattaway et al. | 709/230 |
| 6,243,373 B1 * | 6/2001 | Turock | 370/352 |
| 6,259,701 B1 | 7/2001 | Shur et al. | |
| 6,298,057 B1 | 10/2001 | Guy et al. | |
| 6,324,264 B1 | 11/2001 | Wiener et al. | |
| 6,385,191 B1 * | 5/2002 | Coffman et al. | 370/352 |
| 6,430,282 B1 | 8/2002 | Bannister et al. | |
| 6,570,871 B1 | 5/2003 | Schneider | |
| 7,092,379 B1 | 8/2006 | Singh et al. | |
| 7,336,649 B1 | 2/2008 | Huang | |

FOREIGN PATENT DOCUMENTS

| | | |
|---|---|---|
| WO | 96/20553 | 7/1996 |
| WO | 96/32800 | 10/1996 |
| WO | 96/38018 | 11/1996 |
| WO | 97/14238 | 4/1997 |
| WO | 97/28628 | 8/1997 |
| WO | 97/33412 | 9/1997 |
| WO | 98/12860 | 3/1998 |

OTHER PUBLICATIONS

Yang, "INETPhone: Telephone Services and Servers on Internet, RFC 1789," University of North Texas, Network Working Group, http://tools.ietf.org/html/rfc1789, pp. 1-6, Apr. 1995.

* cited by examiner

INTERNET PHONE SYSTEM AND DIRECTORY SEARCH ENGINE USING SAME

RELATED APPLICATIONS

The present application is a divisional of U.S. patent application Ser. No. 10/927,753, filed Aug. 25, 2004, which is a continuation of U.S. patent application Ser. No. 08/777,824, filed Dec. 31, 1996; the contents of which are hereby incorporated by reference.

TECHNICAL FIELD

The invention relates in general to a system for transmitting voice date over the Internet and, more specifically, to a network architecture that permit voice communications using the Internet Protocol with alphanumeric to Internet address conversion using a directory search engine and a data base of potential callees.

BACKGROUND OF THE INVENTION

The Internet has become the information "superhighway" of choice for an ever increasing number of individuals who have turned to it as an inexpensive and effective way of exchanging electronic data and information. While often thought of as a world-wide network, in reality the Internet is comprised of numerous different networks throughout the world which are linked together using a common routing protocol known as the Internet Protocol ("IP"). This architecture provides widespread access from an unspecified number of terminals or other dial-up equipment around the world.

Individual users, groups and other entities are identified on the Internet by a unique address conforming to the IP. A local access hub provides users with an entry way into the Internet network and acts as the exchange point for both incoming and outgoing data. The data flows along virtual channels consisting of a plurality of gateways, data routers and other physical equipment which work together to form a signal path from message origin to its intended destination. Since a point-to-point connection is never established, the costs to the user are limited to those charged by the local Internet access provider and/or a nominal periodic access fee.

The low cost associated with Internet use has spurred the development of audio applications that allow users to receive and transmit compressed Internet voice messages across the Internet. Typically, a user at one end of the connection speaks into a microphone attached to a Personal Computer ("PC"). The microphone carries the audio voice signal to a processor board in the PC which digitizes the signal and creates a digital voice file. The voice file is compressed and transferred to a selected recipient at a distant point on the Internet. Once received, the voice file is decompressed and converted via digital signal processing to an audible signal intelligible to the human ear.

The typical Internet audio set includes a PC, modem, Internet access software, file compression software and operating system. The user executes the software off the PC's hard disk or floppy drive and the modem provides the hardware communications link with the local Internet access provider. This operation involves turning the PC ON, executing the software, gaining access to the Internet, recording the voice file and transmitting its intended recipient. At the receiving end, the process is substantially the same but in reverse.

While such applications are available and useful for inexpensive long distance calling on the Internet, they do require ownership or access to a computer and some knowledge regarding the installation, operation and execution of the accompanying software. In short, these prior art audio sets have not yet replaced the Plain Old Telephone System ("POTS") on a widespread basis. The POTS, on the other hand, has widespread appeal and provides intuitive operation.

In essence, audio applications for the Internet are still in their infancy. Problems with voice quality and awkward user interfaces detract from their use. As such, the wide array of telephone services available to POTS users are not yet available to complement existing Internet audio sets.

More specifically, with present Internet audio sets, the user is required to know the address of the voice file recipient. When an IP address is dialed, up to 20 digits have to be entered by the caller. Remembering and entering these digits is neither appealing nor practical in most situations.

Before Internet calling becomes a standard in main stream long distance calling applications, the process needs to be eased for the average garden variety long distance caller who would prefer to place a call in the easiest manner possible. Use of the POTS along with their chosen long distance carrier meets their needs since a long distance call over the POTS requires no special equipment, knowledge or information and results in a greater chance of getting through the intended callee.

Thus, a system that combine the simplicity of operation of the POTS with low cost audio access to the Internet would provide numerous advantages over prior Internet audio sets.

SUMMARY OF THE INVENTION

It has been found the prior audio communications systems for the Internet are cumbersome to use and do not provide the functionality long distance callers have come to expect from their more familiar telephone set.

As such, it is a primary object of the present invention to provide a system that simplifies the use of the Internet for long distance calling applications. The invention defines a combination of network elements that provide the user with a POTS look-a-like dialing pad. The dialing pad has an alphanumeric keypad and screen display which provides visual call progress information to the user.

Another object of the present invention is to provide a device that is similar to the POTS. In this regard, a true telephone phone set, one that doesn't require to be booted up to run a standard PC, is provided with a phone keypad for DTMF dialing similar to a regular phone. The set includes a hand set with a receiver and mouth piece and can be used to make voice connections via the PSTN and compressed audio using the Internet protocol.

Still another object of the present invention is to provide a simplified calling means for originating a call on the Internet. A list of known callees can be stored internally inside the dialer and retrieved by the user prior to going off-hook. For unknown callee addresses, a method of address conversion is provided wherein the user enters the alphabetic name of a potential caller on the dialing pad and the name is searched on a user data base to arrive at the corresponding Internet address.

Yet another object of the present invention is to provide a means of initiating an Internet call without prior knowledge of the callee's Internet address. In this regard, an directory engine and user data base of known IP addresses is maintained on a specialized network server accessed through the pad, the PSTN and the other existing Internet components. When a hit is made on the data base, the name is returned to the user on the dial pad's display screen. A caller simply enters the alphabetic string name and the directory engine converts the string to its Internet address equivalent for the callee or callees in the database. When more than one hit is made, all of the matching names are displayed on the dialer screen permitting the calling party to scroll the list and selected the intended callee.

In one aspect, the present invention defines an Internet compatible dialer pad with an integrated modem set that is operated by the user via an extended keypad with alphanumeric entry keys and function keys. The dialer has an integrated display screen and display electronics that renders visual call progress information to the user as well as other communications indicators and related information about the current Internet connection.

In another aspect of the invention, the dialer uses the Public Switched Telephone System ("PSTN") and standard LAN/WAN technology to gain access to a plurality of Internet enhanced calling systems. A directory search engine and user data base permit the caller to obtain callee information by entering alphanumeric characters on the dialer's keypad. Links from the PSTN to an Internet data base are not restricted to a specific digital data protocol. Suggested transmission protocols for the data base and search engine include ATM, ISDN or others depending on data traffic.

For a more complete understanding of the present invention, including its features and advantages, reference is now made to the following detailed description, taken in conjunction with the accompanying drawings.

BRIEF DESCRIPTION OF THE DRAWINGS

In the drawings.

Corresponding numerals refer to corresponding parts in the figures unless otherwise indicated.

DETAILED DESCRIPTION OF THE INVENTION

Figure 1:
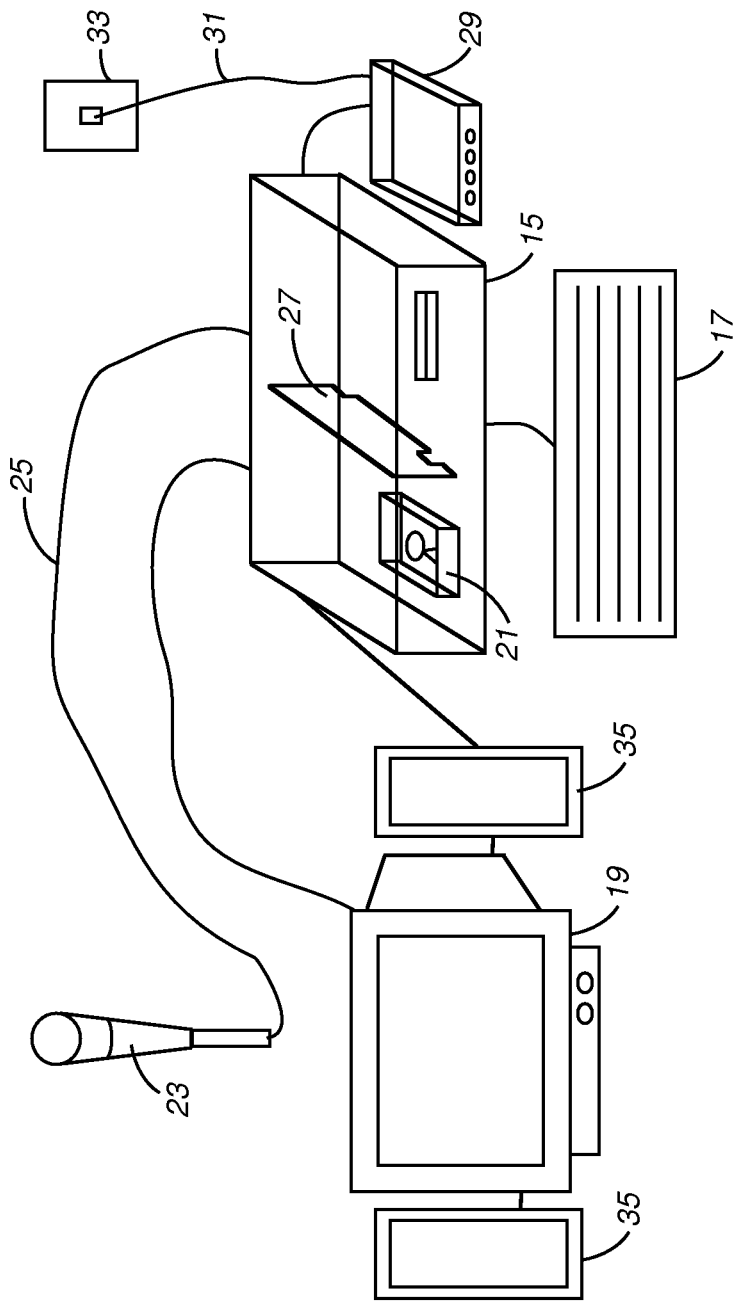
FIG. 1 illustrates a prior art Internet audio set.

In FIG. 1, a prior art Internet audio set is shown and denoted generally as 10. Internet set 10 includes a personal computer (PC) 15 with a keyboard 17 and monitor 19. Inside the PC 15 are a plurality of application programs which are stored generally on hard disk 21. A microphone 23 is communicably attached to the PC 15 via cable 25 which carries audio signals from the user to a processing board 27. The processing board 27 digitizes the voice signal and creates a voice file which can be stored on hard disk 21 prior to transmission.

In operation, a user gains access to the Internet via an application program stored on hard disk 21. The manner and steps involved in such a process vary depending on the type of PC 15 and software program used. A plurality of Internet access providers may be used for this purpose wherein the user subscribes to the provider and uses a modem 29 to establish the communications link between the user and the provider. In general, the user executes a voice recording program stored on hard disk 21. The voice recording program accepts an audio signal input via the microphone 23 and operates the processing board 27. Other PC 15 functions can be operated using keyboard 17.

The processing board 27 receives the audio analog signal from the user via the microphone 23 and cable 25 and creates a corresponding digital file using on-board digital signal processing. The techniques and methods of digital signal processing are well known in the industry and by those skilled in the art.

Next, the user selects an intended recipient from the application program interface and the digital audio file is sent to the chosen recipient via the modem 29. As shown, the modem 29 is communicably attached via cable 31 to the Public Switched Telephone Network ("PSTN") 33. Call and transmission progress information are displayed on monitor 19 depending on the status of the connection. For example, the monitor 19 can display the recipient, connection status and latest activity. Other information can be displayed depending on the software program used and the functionality of the Internet audio set 10.

The audio set 10 can also be used to receive audio files using the PSTN 33 connection and modem 29. In general, a transmitting party at a distant location uses the address of the audio set 10 to transmit digitized audio messages over the Internet in the manner described above. The audio set 10, and more specifically processing board 27, receives the incoming audio signal and transforms it to its corresponding analog equivalent. The analog audio signal is broadcast over the PC speaker 35 which is controlled by the audio application software.

Thus, the prior art audio set 10 provides a mechanism for voice communications over the Internet using the above described process and hardware shown in FIG. 1. Variations of set 10 are also available using similar methods of operation and allowing users a plurality of similar functionality. Such systems, however, are substantially similar in that they depend on use of a PC 15, application programs, and other similar equipment as shown in FIG. 1.

Figure 2:
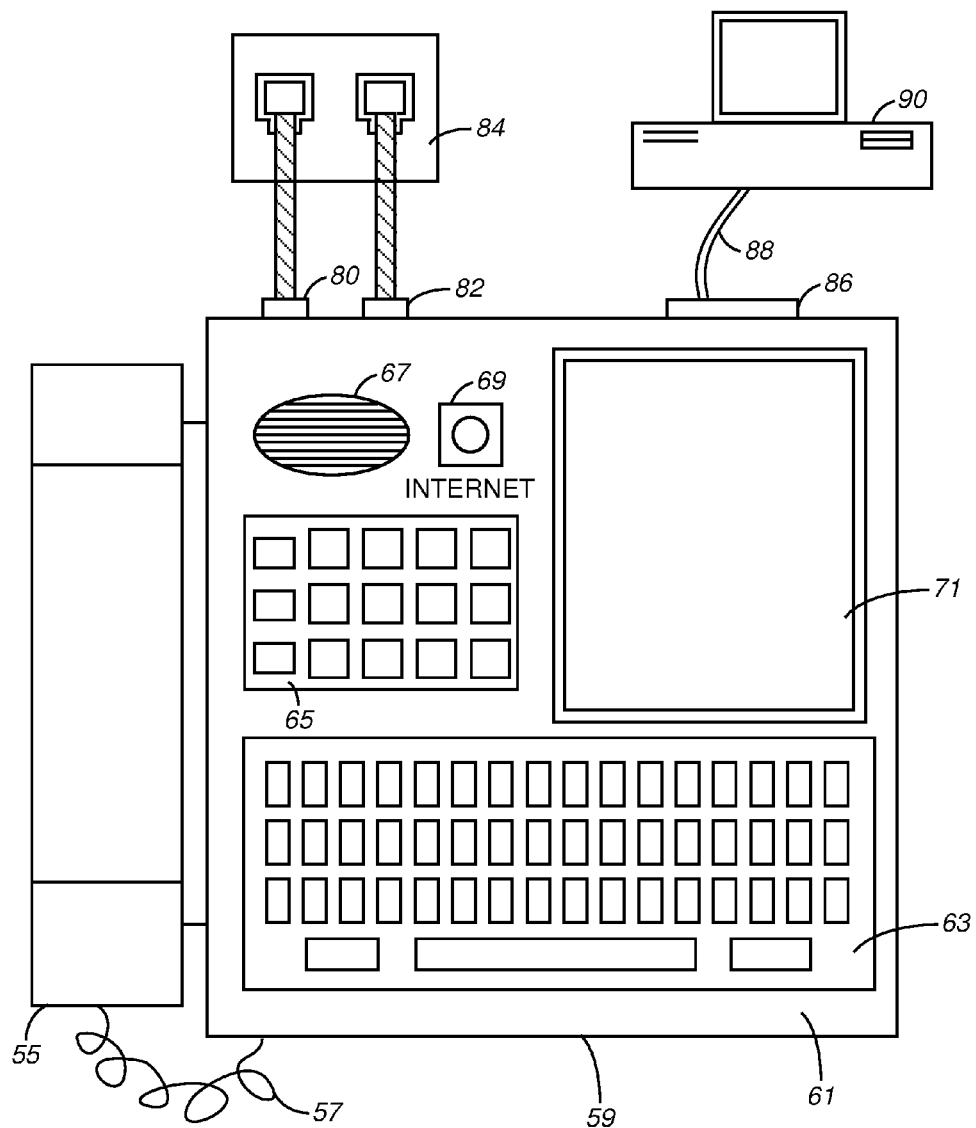
FIG. 2 is a top side view of the Internet dialer pad according to part of the invention.

Turning now to FIG. 2, one aspect of the invention is shown, the phone dialing pad, and denoted generally as 50. Dialing pad 50 has many of the features of a Plain Old Telephone System ("POTS") including hand set 55 which has an ear piece 58 and a mouth piece 56 for hearing and speaking, respectively. The hand set 55 can be used to transmit and receive the pure analog audio signals, which are digitized and processed for transmission on the network.

As shown, the hand set 55 is communicably attached via cable 57 to base 59. The base 59 houses the various telecommunications devices as herein described and as can be appreciated by those skilled in the art.

Accessible from on the top 61 of base 59 are various keys and input devices which control the operation and functionality of the dialing pad 50. An alphanumeric keyboard 63 provides a QWERTY type interface from which the user can enter alphabetic and numeric entries and messages to be included in the Internet message stream. The keyboard 63 is similar to the input device of a typical desktop computer.

In one embodiment, a numeric keypad 65 is shown and provided to give the identical Dual Tone Multifrequency ("DTMF") push button operation of a POTS. Thus, in operation a user lifts the hand set 55 and dials into the PSTN using keypad 65 to make normal voice DTMF telephone calls. In this way, POTS functionality is provided by the dialing pad 50 according to one embodiment.

A microphone 67 is provided on the base 59 and used to receive and transmit audible signals from and to the user. The microphone 67 is controlled by internal electronics inside the base 59 (see FIG. 3) and provides audible incoming and outgoing audio signals. In the alternative, audio signals can be received and transmitted via the hand set 55 using the ear 56 piece and mouth piece 58, respectively.

According to one embodiment, an Internet access button 69 is provided on the base 59 and used to switch between normal DTMF voice calls and Internet dial-up operations. In this way, access button 69 can be used to initiate an Internet connection using the internal modem set (not shown in FIG. 2) without interrupting the present DTMF initiated switched voice connection.

An integrated display screen 71 is provided to give the user visual information about the current Internet connection as well as other connection/status information. For example, the display screen 71 can show the current callee, a stored list of available callees including their Internet addresses, the identity of the transmitting party and his Internet address, a list of the most currently received or transmitted messages or other similar information according to the preprogrammed functionality of the dialer pad 50.

As such, it should be understood that a wide range of information may be displayed on the display screen 71. In the preferred embodiment, display screen 71 is a liquid crystal display of the type commonly found in industry.

The dialing pad 50 connects to the PSTN via jacks 80 and 82 which provide dual line access to the PSTN via outlets 84. This configuration provides concurrent DTMF and Internet connections. In an alternative embodiment, single line access is provided wherein the dialing pad 50 is used as either a DTMF voice or Internet audio set per single session. In one embodiment, the connection mode is selected by the user with button 69.

A connection 88 to a computer 90 is also provided to permit the transfer of Internet formatted messages between the dialing pad 50 and the computer 90. An RS232 jack 86 is the preferred interface between the Internet phone 50 and the computer 90 for serial data transfers although other connection protocols, such as parallel bus, may be used.

Figure 3:
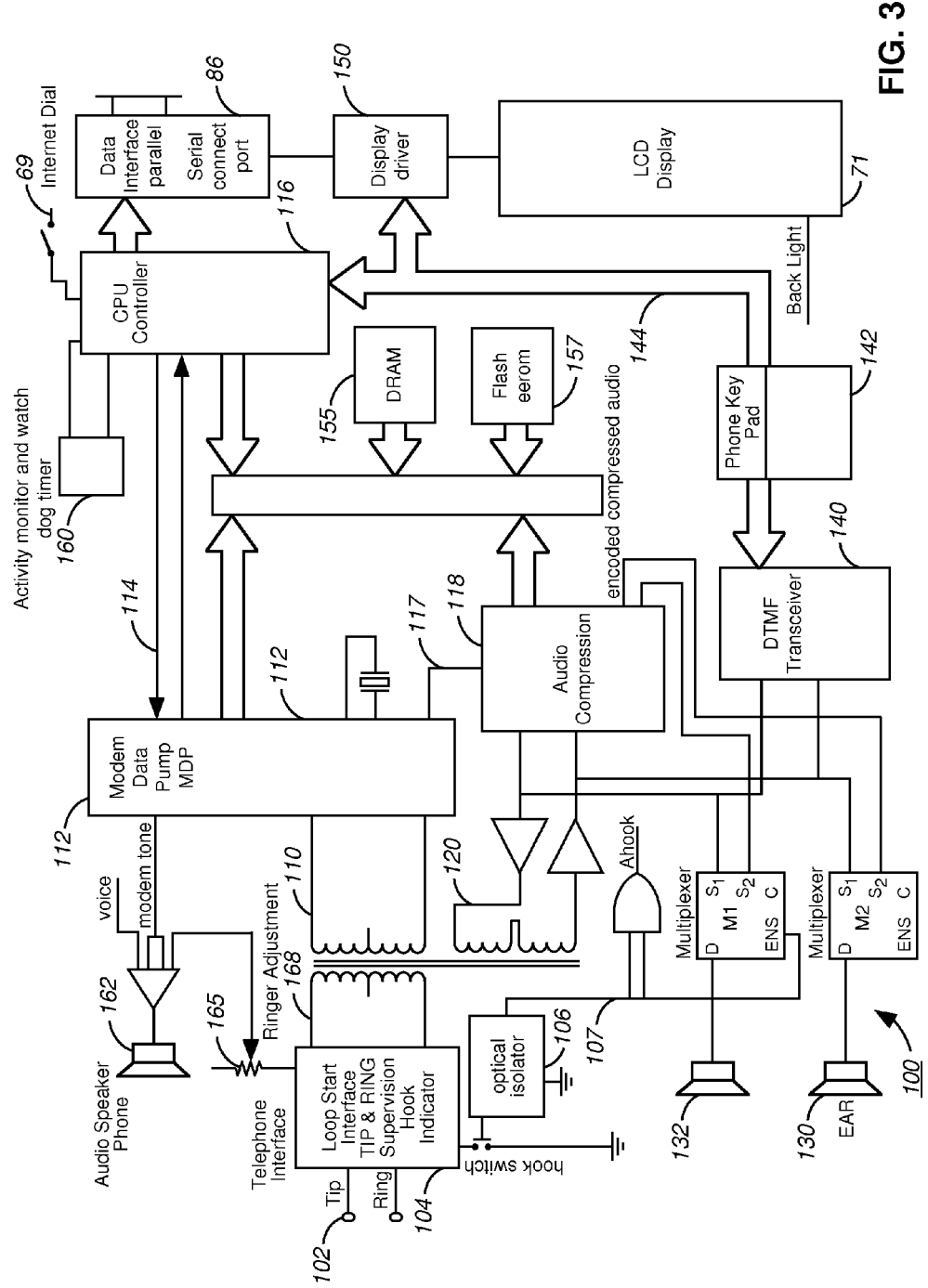
FIG. 3 is a detailed circuit diagram for the dialer pad shown in FIG. 2 according to embodiment of the invention.

In FIG. 3, a circuit diagram for the dialing pad 50 is shown and denoted generally as 100. Circuit diagram 100 is one possible arrangement of components. Those skilled in the art will appreciate that other configurations may be employed. The components are maintained inside the base 59 and assembled during manufacturing by well known means such as on a printed circuit board. Standard off-the-shelf components which are readily available in the market place may be used for most devices and, as such, no particular or specific device is necessary to achieve the objects of the invention as herein described.

As shown, a telephone line interface 102 serves as a connection between the PSTN and the dialing pad 50. A supervisory circuit 104 provides the Onhook/Offhook mechanism between the interface 102 and the PSTN and is operated by the optical isolator 106. The analog signal is received superimposed on a DC level carrier which is isolated via the transformer primary 108.

The analog signal is dropped across the secondary portion 110 of the line transformer where it is load balanced and received by the modem data pump 112. In essence, the telephone line interface 102, isolator circuit 106, and transformer 108, 110 form a direct access arrangement of the type well known by those skilled in the art. It should be understood, however, that other similar configurations and methods of interfacing the modem data pump 112 to the PSTN can be used.

The modem data pump 112 is controlled by CPU controller 116 via path 114. In various embodiments, the data pump 112 supports a plurality of data transmission, compression and error correction protocols including, without limitation, V.34, V.32, V.22, V.42 LAPM, MNP2-5 and still others. Such protocols are well known by those skilled in the art.

An audio compression circuit 118 is also shown coupled to the data pump 114 via path 117 which supports known Internet audio standard protocols such as G.723, G.725 and G.729. The compression circuit 11B also supports G.711 which is the standard audio protocol for all POTS. As shown, circuit 118 is coupled to the primary 108 via coil 120 allowing bidirectional audio transmission through and from the PSTN.

A speaker 130 and microphone 132 are provided to provide the user with an audible signal output and voice input, respectively. During an Internet audio session, the optical isolator circuit 106 enables the microphone 132 portion of the circuit 100 via path 107. Signals from the microphone 132 are received by the compression circuit 118 and transferred to the data pump 112 for signal processing and transmission on the PSTN to its intended recipient using well known modulation/demodulation techniques.

Likewise, signals received from the PSTN via the data pump 112 are deencoded by the compression circuit 118 and delivered to the user via the speaker 130 as an audible output signal. The corresponding multiplexing logic (M1 and M2) are shown arranged in FIG. 3 per one embodiment.

DTMF functionality is supported via transceiver circuit 140 and phone keypad 142. This arrangement gives the Internet phone 50 DTMF dial-up capabilities for normal voice connections on a switched circuit basis and alphanumeric entry during Internet sessions. The phone keypad 142 combines the inputs from the keyboard 63 and keypad 65 shown in FIG. 2 and is coupled to the controller 116 via pathway 144. The controller 116 is programmed to select the correct input device depending on the type of connection, either standard DTMF or Internet Protocol.

The preferred display screen 71 is a Liquid Crystal Display of the type known to those skilled in the art and is controlled by display driver circuit 150 and controller 116 via path 144. Other system components include memory circuits 155 and 157, which, provide the microprocessor with permanent and erasable memory area segments for performing the various functions herein described. Such functions include power-up sequences, system checks and other standard system verification processes as well as call connect functions, user features and still others.

One feature of the Internet phone is the ability to connect to existing Internet access provider services without requiring extensive software knowledge by the user. In one embodiment, access parameters are maintained on the erasable and programmable memory circuit 157. The access parameters control how the phone 50 connects to the user's Internet access provider.

In one embodiment, the user is prompted to enter a plurality of access parameters such as the provider's telephone number, IP address, domain name server address, user name, password and other similar parameters during initial setup. The Internet access setup program is stored internally by the controller circuit 116 and input by the user is accomplished using the phone keypad 142. These parameters are stored in memory circuit 157 and used for connection to the provider once the Internet access button 69 is depressed.

The controller 116, as shown, initiates the connection using the parameters stored in the memory circuit 157. In this regard, a setup program can be internally maintained and executed upon initial use or setup by the user.

Also, the erasable memory circuit 157 can be used to store a list of common recipients by their Internet addresses. Alternatively, the user creates new recipients for further use and retrieval using the alphanumeric keyboard 63 of the phone keypad 142.

Other system components are illustrated in FIG. 3 such as watch dog timer circuit 160, audio speaker phone 162 and ringer adjustment circuit 165 all of which are well understood by those skilled in the art.

Figure 4:
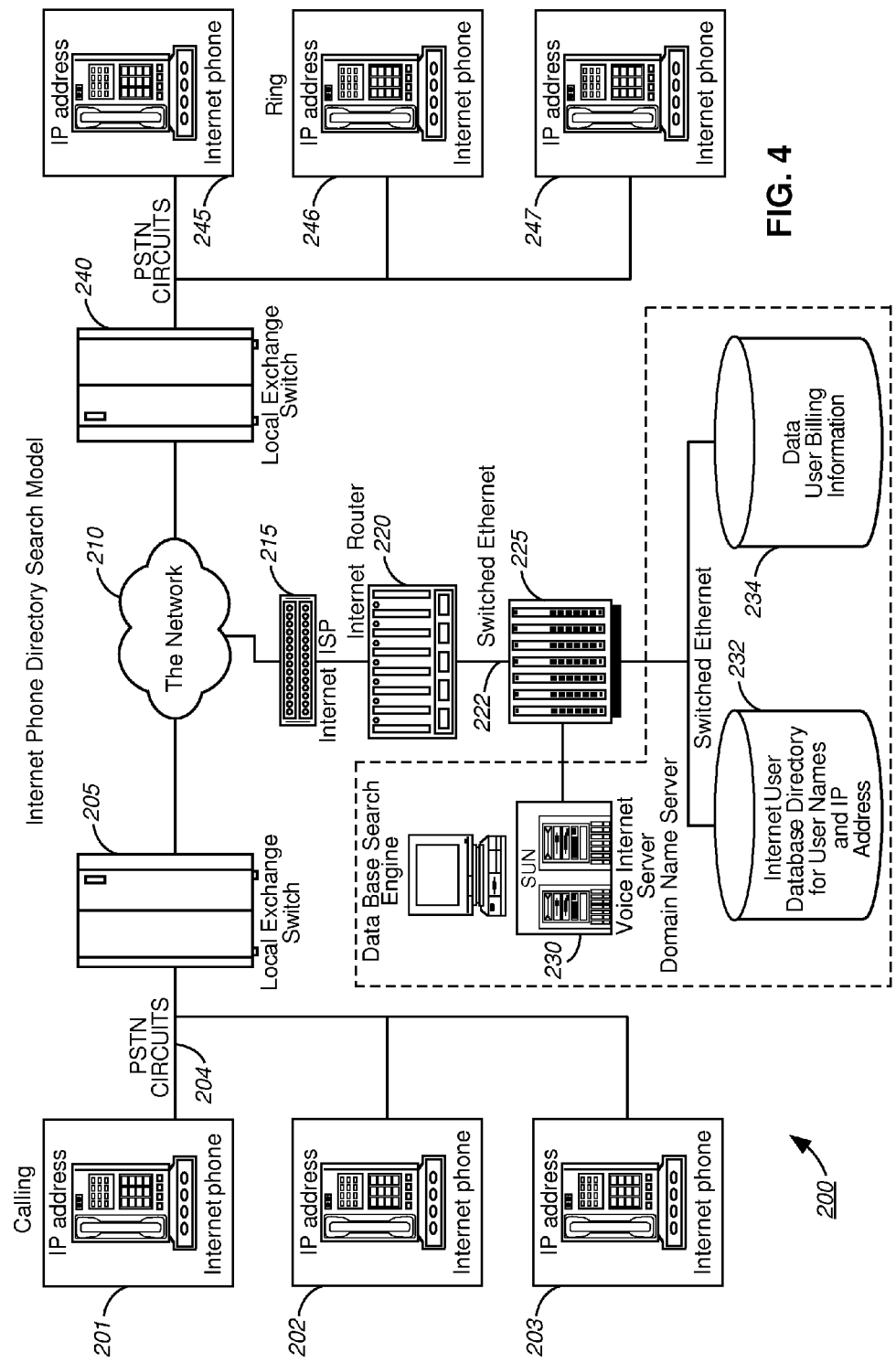
FIG. 4 is an architectural block diagram of an Internet directory search engine according to one embodiment of the invention.

Turning now to FIG. 4, an architectural model illustrating the Internet address search directory system according to another aspect of the invention is shown and denoted generally as 200. As shown, a plurality of caller dial pads 201, 202 and 203 are connected to a local exchange switch 205 via PSTN circuits 204. The PSTN circuits 204 and local exchange switch form part of the local telephone network within the user's geographic area.

For Internet connections, exchange 205 routes the incoming calls from the dial pads 201, 202 and 203 to the user's Internet Service Provider ("ISP") 215 via established Network 210 paths. Next, the message is parsed and decoded to determine the recipient before routing 220 it using switched Ethernet circuits 222. As is appreciated by those skilled in the art, various routing methods and network devices 225 may be employed to establish the end-to-end message path.

As shown, a plurality of callees 245, 246 and 247 are situated at a second location. The callees 245, 246 or 247 may have an established Internet audio connection and is prepared to receive the audio message from any one of the callers 201, 202 or 203. Alternatively, the callees 245, 246 or 247 may dial in to their service provider 215 and obtain the sent audio message at a later time. Typically, the audio file message is stored by the service provider in an electronic mail box until it is delivered to its intended recipient.

In short, audio calls made from the dial pads 201, 202, 203 are routed through the network 210 and reach a second local exchange switch 240 at a distant geographic location. The local carrier determines the circuit to the appropriate callee 245, 246, or 247, who, in turn, can respond to original caller in like fashion. The process can be repeated to permit conversations of varying lengths similar to those achieved with the POTS.

Address Conversion

Using the Data Base Search Engine 230, a caller (201, 202 or 203) may initiate a call to a callee (245, 246 or 247) without prior knowledge of the callee's Internet to address. The dial pad 50 has an internal memory area where a list of callee Internet addresses can be stored for future call operations. Alternatively, the search engine 230 can store the Internet addresses on user data base 232 and convert the alphanumeric callee identifier to its corresponding Internet address.

A callee search can also be performed using the user data base 232. A call request is made at the caller side 201, 202 or 203 using the alphanumeric keypad (63 in FIG. 2). At this point, the data stream is parsed to determine if a search request has originated from any one of the dial pads 201, 202 or 203. If so, the request is forwarded to the Data Base Search Engine 230 which is configured to process the request for authorized users. This functionality can be provided to users who have ordered or cleared for Internet voice services similar to ordering calling features such as waiting or call return with the POTS.

Alternatively, the audio functions can be provided to users on a per use charge basis. If so, the billing information can be maintained on the user billing information database 234.

The search engine 230, user data base 232 and user billing information database 234 provide the means for converting alphanumeric call identifiers to their equivalent Internet address format thus eliminating the need to remember and enter numeric Internet routing addresses conforming to the Internet Protocol.

This greatly simplifies the use of the Internet for long distance calling applications. When a callee's address matching the caller's 201, 202, 203 search request is found, the name is displayed on the display screen 71 of the dial pad 50. The caller then has the option of completing the call to the address. When more than one hit is made, the names of the qualifying user callees are displayed. The caller then has the option of selecting from a scrolled list of potential users using the dial pad's keyboard 63 to select the intended caller.

Figure 5:
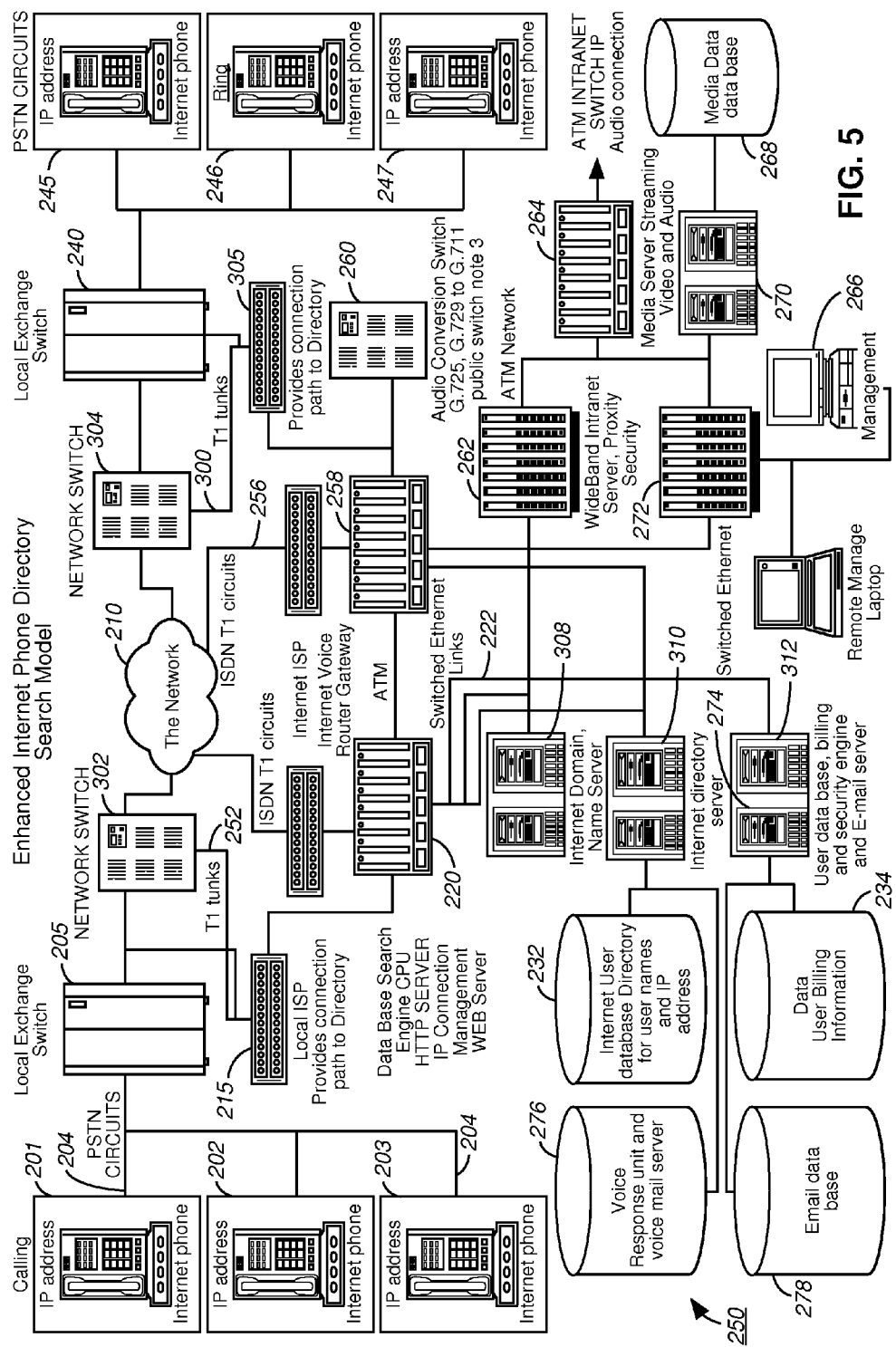
FIG. 5 is an architectural block diagram of an enhanced Internet phone directory search engine according to one embodiment of the invention.

The architectural scheme of FIG. 4 can be enhanced to provide further audio functionality over the Internet. In FIG. 5, a more sophisticated Internet phone directory search engine topology is depicted and denoted generally as 250. T1 trunk lines 252, 300 connect the local exchange switches 205, 240 to the local ISPs 215, 305 and to network switches 302, 304. Likewise, ISDN circuits 254, 256 can provide the link between the network 210 and servers functions 308, 310 and 312. This topology bridges service providers of varying levels of functionality (those that do not provide directory search functions) to an ISP having the Internet conversion features such as those described herein.

Thus, a single user data base 232 can be accessed by a wide range of ISPs at different locations. Links from the PSTN to an Internet data base are not restricted to a specific digital data protocol. Suggested transmission protocols for the data base and search engine include ATM, ISDN or others depending on data traffic.

The bridge, router gateways 220 and 258, provide the virtual pathways from ISPs 215 and 305 to servers 308, 310 and 312. A single user data base 232, user billing information database 234, mail server 276 and email data base 278 provide network wide functionality.

Also shown is ATM network server 262 directly coupled to the Internet DNS 308 giving ATM network users the same Internet conversion advantages of the present invention. An audio conversion switch 260 provides the conversion from Internet audio formats G.725, G.729 to audio phone formats G.711.

Thus, by providing a plurality of connections between the audio conversion servers 308, 310, 312 and other network Internet access points, users at many different network levels can take advantage of the present invention.

Figure 6:
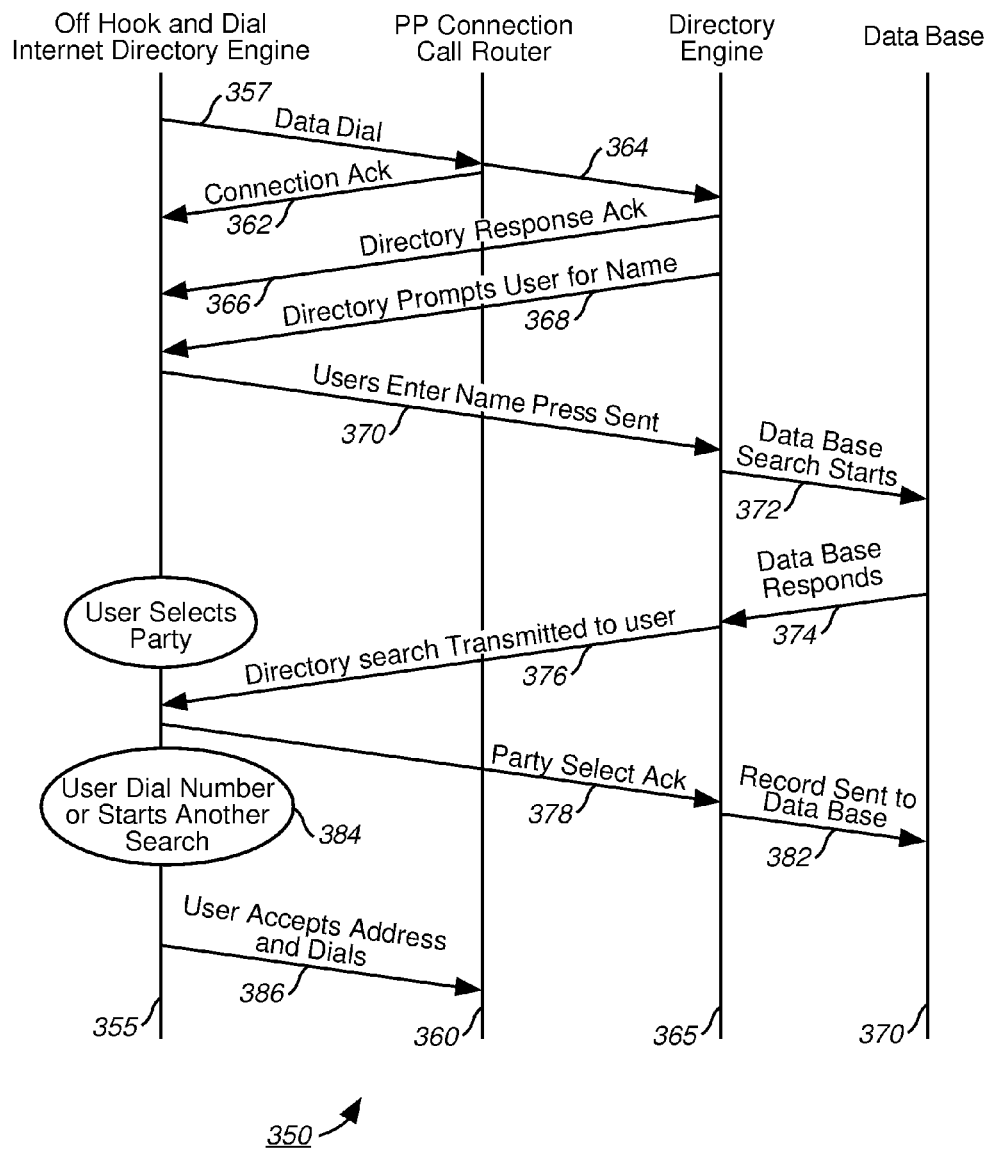
FIG. 6 is a call progress flow diagram for an Internet phone directory connection according to one embodiment of the invention.

Turning now to FIG. 6, a call progress flow diagram for connection to the directory search engine 230 is shown and denoted generally as 350. The process starts with step 357 wherein a user 355 initiates a call by dialing out to establish an Internet connection 360. A successful connection is acknowledged 362 and the call routed 364 to the directory engine 365. The directory engine 365 transmits a response acknowledge 366 to the user 355 and prompts the user 355 for a callee name 368.

Next, the user 355 enters an alphanumeric character string and sends it 370 in an Internet formatted message to the directory engine 365. The message is parsed and a data base search is performed 372 to find all user names and addresses of matching callees. Once the search is completed, the database responds 374 and the search results are transmitted to the user 376.

The calling party selects a callee from the response list 378 and a record of the callee's Internet address is sent to the user data base 380 for future reference. At this point, the caller can place the call using the found Internet address or start another search 382. If a dial attempt is made, the user accepts the address and dials 386 to the selected callee.

While this invention has been described and referenced to illustrative embodiments, the description is not intended to be construed in a limiting sense. Various modifications and combinations of illustrative embodiments as well as other embodiments and inventions will become apparent to those persons skilled in the art upon reference or description. It is, therefore, intended that the pendent claims encompass any such modifications or embodiments.

What is claimed is:

1. A telephony station for supporting telephony services, comprising:
    a physical keypad for providing Dual Tone Multifrequency (DTMF) dialing and alphabetic input to establish a switched voice call, said physical keypad having a connection to at least two Public Switched Telephone Network (PSTN) jacks for a single voice conversation telephone call including concurrent Dual Tone Multifrequency (DTMF) initiated switched voice communication with audio phone format and functionality of a Plain Old Telephone System (POTS) via one of the PSTN jacks and a packet-switched voice call with Internet audio format via another of the PSTN jacks, whereby a caller may make the packet-switched voice call to a callee via an Internet Service Provider while maintaining the DTMF initiated switched voice communication with the callee;
    a physical button, separate from the keypad, for initiating a packet-switched voice call via the Internet Service Provider;
    an alphanumeric keyboard for inputting a callee identifier with an alphabetic character corresponding to the packet-switched voice call; and
    a display coupled to the alphanumeric keyboard and configured to display the callee identifier, wherein
    the physical keypad, the physical button, the alphanumeric keyboard, and the display are housed in a base of the telephony station,
    the packet-switched voice call is initiated by a caller to an Internet address of the callee by entering the callee identifier,
    the callee identifier is converted to the Internet address, and
    after the callee identifier is converted to the Internet address, the packet-switched voice call is sent from the telephony station to the Internet address of the callee,
    wherein the physical button is configured to initiate the packet-switched voice call via the Internet Service Provider to the callee without interrupting a current DTMF initiated switched voice connection by the telephony station.

2. A station according to claim 1, wherein the packet-switched voice call is a long distance call.

3. A station according to claim 1, wherein the callee identifier is not a valid domain name.

4. A station according to claim 1, wherein the physical key pad comprises numeric keys corresponding to the DTMF dialing.

5. A station according to claim 1, wherein the physical key pad comprises alphanumeric keys, and at least one key corresponds to the DTMF dialing.

6. A station according to claim 1, wherein the display shows information regarding a current callee.

7. A station according to claim 1, wherein the display shows a list of available callees.

8. A station according to claim 1, wherein the display shows a network address of an available callee.

9. A station according to claim 1, further comprising:
    a communication interface configured to communicate with a computer to exchange data.

10. A method for placing a call over a data network, comprising:
    dialing, via a physical keypad of a telephony station, Dual Tone Multifrequency (DTMF) digits to establish a switched voice call over a first jack, wherein the physical keypad provides the Dual Tone Multifrequency (DTMF) dialing and alphabetic input to establish the switched voice call, said physical keypad having a connection to at least two Public Switched Telephone Network (PSTN) jacks for a single voice conversation telephone call including concurrent Dual Tone Multifrequency (DTMF) initiated switched voice communication with audio phone format and functionality of a Plain Old Telephone System (POTS) via one of the PSTN jacks and a packet-switched voice call with Internet audio format via another of the PSTN jacks, whereby a caller may make the packet-switched voice call to a callee via an Internet Service Provider while maintaining the DTMF initiated switched voice communication with the callee;
    subsequent to establishing the switched voice call via the one of the PSTN jacks, initiating, via a physical button that is separate from the keypad, the packet-switched voice call over the other of the PSTN jacks after; and
    inputting a callee identifier for initiation of the packet-switched voice call to the callee, wherein
    the packet-switched voice call is initiated by a caller to an Internet address of the callee by entering the callee identifier,
    the callee identifier is converted to the Internet address, and
    after the callee identifier is converted to the Internet address, the packet-switched voice call is sent from the telephony station to the Internet address of the callee,
    wherein the physical keypad, the physical button, and the alphanumeric keyboard are housed in a base of the telephony station,
    wherein the physical button is configured to initiate the packet-switched voice call via the Internet Service Provider to the callee without interrupting a current DTMF initiated switched voice connection by the telephone station.

11. A station according to claim 10, wherein the packet-switched voice call is a long distance call.

12. A station according to claim 10, wherein the callee identifier is not a valid domain name.

13. A station according to claim 10, wherein the physical key pad comprises numeric keys corresponding to the DTMF dialing.

14. A station according to claim 10, wherein the physical key pad comprises alphanumeric keys, and at least one key corresponds to the DTMF dialing.

15. A station according to claim 10, further comprising:
    displaying information regarding of a current callee.

16. A station according to claim 10, further comprising:
    displaying a list of available callees.

17. A station according to claim 10, further comprising:
    displaying a network address of an available callee.

18. A station according to claim 10, further comprising:
    communicating with a computer to exchange data.

* * * * *